United States Patent [19]

Heron, Jr.

[11] Patent Number: 4,931,901
[45] Date of Patent: Jun. 5, 1990

[54] METHOD FOR ADJUSTING CAPACITOR AT MANUFACTURE AND PRODUCT

[75] Inventor: John B. Heron, Jr., Wichita Falls, Tex.

[73] Assignee: Sprague Electric Company, North Adams, Mass.

[21] Appl. No.: 354,183

[22] Filed: May 19, 1989

[51] Int. Cl.$^5$ .................. H01G 1/147; H01G 4/06
[52] U.S. Cl. ................................ 361/321; 29/25.42
[58] Field of Search ............ 361/328, 329, 330, 306, 361/321; 29/25.42

[56] References Cited

U.S. PATENT DOCUMENTS

| | | | |
|---|---|---|---|
| 2,665,376 | 1/1954 | Kodama | 361/329 X |
| 3,496,434 | 2/1970 | Prokopowicz | 361/330 X |
| 3,586,933 | 6/1971 | Boniani | 361/321 |
| 3,898,541 | 8/1975 | Weller | 317/261 |
| 4,047,240 | 9/1977 | Insetta | 361/321 X |
| 4,247,881 | 1/1981 | Coleman | 361/302 |
| 4,419,713 | 12/1983 | Levinson | 361/321 |
| 4,513,350 | 4/1985 | Coleman | 361/321 |
| 4,661,884 | 4/1987 | Seaman | 361/306 |

FOREIGN PATENT DOCUMENTS 46-27094 8/1971 Japan.
1340414 12/1973 United Kingdom.

Primary Examiner—Donald A. Griffin

[57] ABSTRACT

A method for making multilayer ceramic capacitors (MLC) has two phases, namely a first test phase and a second manufacturing phase. A test MLC capacitor with buried overlapping electrodes is made and the capacitance of that test capacitor is measured. In the subsequent manufacturing phase the same process is used to make the same capacitor except adding to it at least one pair of coplanar electrodes whereby the small capacitance between each pair of coplanar electrodes is parallel connected with the base capacitor to bring the total capacitance up close to a target value. This method is particularly valuable for making close tolerance capacitors having only a few conventional overlapping electrodes, because each pair of coplanar capacitance-adjusting electrodes has a relatively small, stable, predictable incremental capacitance that is insensitive to changes in registration between successive electrodes.

3 Claims, 1 Drawing Sheet

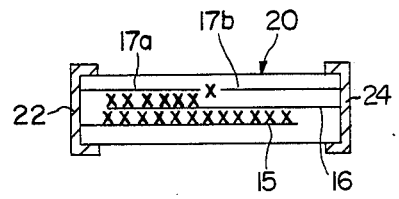
FIG.1
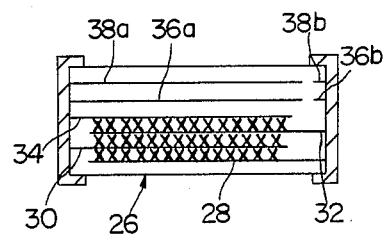
FIG.4
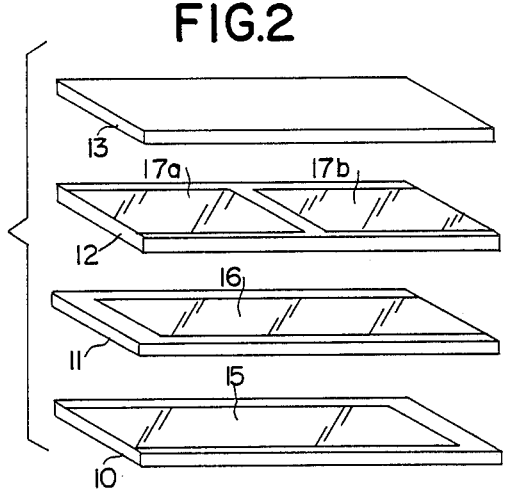
FIG.2
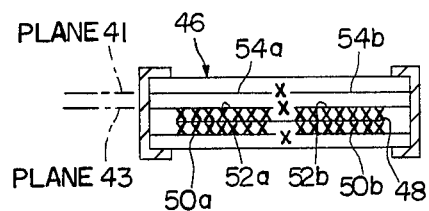
FIG.7
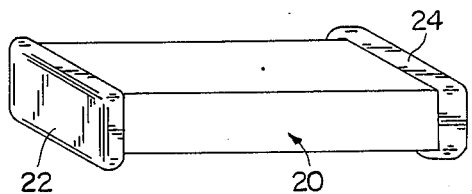
FIG.3
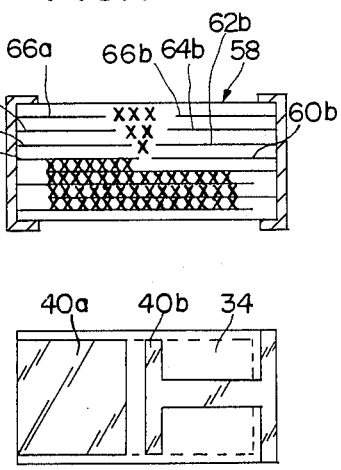
FIG.8
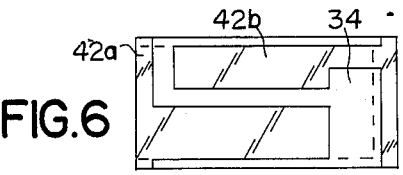
FIG.5
FIG.6

METHOD FOR ADJUSTING CAPACITOR AT MANUFACTURE AND PRODUCT

BACKGROUND OF THE INVENTION

This invention relates to a method for manufacturing multilayer ceramic capacitors including adjusting the capacitance thereof, and relates to the capacitor product made thereby that includes alternate overlapping electrodes plus at least one pair of coplanar capacitor-adjusting electrodes.

Multilayer ceramic capacitors typically include a ceramic block or body containing mutually parallel overlapping buried electrodes, the alternate of which extend to one body side face and the remaining buried electrodes extend to the opposite side face. Terminals are attached to the two opposite side faces contacting respectively these two groups of interdigitated mutually parallel buried electrodes. The total capacitance value $C_T$ obtained is predicted by the standard formula $C_T = KA_o/t$ where K is the dielectric constant, $A_o$ is the total area of overlapping between oppositely polarized electrodes and t is the distance between adjacent overlapping electrodes, i.e. the thickness of the active ceramic dielectric between adjacent overlapping electrodes.

For a given target capacitance value, it is normally desirable to use a few rather than many overlapping electrodes by using as thin active dielectric layers as is practical, because of the high cost of electrode materials, e.g. silver and palladium.

But when a small capacitance value is sought and the number of overlapping electrodes is very few, to use one more or to use one less produces a large incremental change in total capacitance so that such a means becomes increasingly impractical for adjusting capacitance value as the number of overlapping electrodes decreases. An alternative is to manufacture a large number of such capacitors to a broad capacitance tolerance and sort out those that meet the tight tolerance. This is usually risky because of the large inventory of broad tolerance capacitors that is left for which no market may be found.

It is therefore an object of the present invention to provide a method for making small incremental adjustments in capacitance values of multilayer ceramic capacitors.

It is further an object of the present invention to provide a multilayer ceramic capacitor having, in addition to the conventional overlapping electrodes, at least one pair of capacitance adjusting coplanar electrodes.

SUMMARY OF THE INVENTION

A method for manufacturing multilayer ceramic capacitors comprises two phases. In a first phase a conventional process is used to make a test capacitor having a ceramic body containing a system of mutually overlapping buried electrodes some of which extend to one body face and others to another face. The capacitance of this test capacitor is measured and the amount by which that measured value is less than a target capacitance value is determined.

The second phase of this method comprises manufacturing a plurality of multilayer ceramic capacitors by the same method used to make the test capacitor, except adding to it at least one pair of spaced apart buried coplanar electrodes extending to the same one and another body faces as are the overlapping system of buried electrodes. These coplanar electrodes are provided a geometry, e.g. gap width and length, that will add the amount by which the test capacitance fell short of the target value so that substantially all of the manufactured capacitors made in the second phase will have a near-target-value capacitance.

This invention recognizes that the fringing field capacitance at the gap between two coplanar buried electrodes is substantially smaller than the capacitance between two overlapping electrodes positioned in two adjacent planes and of commensurate size, so that relatively small incremental increases of capacitance can be realized by adding such coplanar electrode pairs; and further that the capacitance of a coplanar electrode pair, repeatably formed using a tool having a fixed pattern (e.g. a silk screen), is repeatable and not subject to change due to change in registration between adjacent of such coplanar pairs.

This invention is especially useful for providing small value capacitors (<10pf) to a close tolerance (e.g. ±10%).

BRIEF DESCRIPTION OF THE DRAWING

FIG. 1 shows in side sectional view a capacitor of this invention.

FIG. 2 shows in exploded view four green ceramic layers that are stacked, sintered and terminated to make the capacitor of FIG. 1.

FIG. 3 shows in perspective view the capacitor of FIG. 1.

FIGS. 4, 7 and 8 show in side sectional view second, third and fourth capacitors of this invention.

FIGS. 5 and 6 each show in top view coplanar-electrode electroding ink patterns having alternate geometries.

DESCRIPTION OF THE PREFERRED EMBODIMENTS

If it had been known, the capacitor of this invention that is illustrated in FIGS. 1, 2 and 3 would have been made by one or the other of two well known methods. One entails preparing self supporting tapes 10, 11, 12 and 13 of a green ceramic by a conventional extruding or similar process. A silver palladium electroding ink would then be screen printed on the top faces of tapes 10, 11 and 12 in patterns 15, 16 and 17 respectively, as shown in FIG. 2. These tapes would then be stacked and sintered at about 1100° C. to drive out the organic constituents of the green ceramic tapes and of the electroding ink, to densify and mature the ceramic and to produce a unified body 20.

The other known method is a variation of the first.

The stack is made in a standard reitterative curtain coating process, or comparable spraying process. In the curtain coating process the green ceramic layer 10 would be first formed by passing a carrier or substrate (not shown) through a falling curtain of a ceramic slip, drying the slip coating and screen printing the ink pattern 15 thereon. The substrate would then be passed through the curtain again to cover the layer 10 and ink pattern 15 with a second ceramic layer 11. Layer 11 would also be dried before ink pattern 16 is screen printed. This procedure would be repeated to build the additional layers and to complete the stack. Thin active dielectric layers of 2 and 3 microns can be made this way.

The body 20 of FIGS. 1, 2 and 3 contains two conventional mutually overlapping buried electrodes 15 and 16 in unique combination with a buried electrode pattern 17 composed of two spaced-apart coplanar electrodes 17a and 17b.

End terminations 22 and 24 are formed by coating the left and right side faces (as shown) of the ceramic body 20. This is accomplished by a standard coating of those body side faces with a silver loaded paste and heating to remove the organic components and to solidify and bond the terminals to the ceramic.

The capacitance of this capacitor is mainly attributable to the capacitance between the conventional overlapping electrodes 15 and 16 that are connected at opposite side faces to terminals 22 and 24 respectively. The region of "active" ceramic dielectric between overlapping electrodes 15 and 16 is indicated by X's in the Figures. Coplanar electrode 17a is connected to terminal 22 and has an overlapping capacitive relationship, also indicated by X's, with electrode 16. Coplanar electrode 17b, connected to capacitor terminal 24, has no overlapping capacitive relationship with any other electrode and has a relatively small edge-fringe or gap capacitance with its mutually coplanar partner 17a. The "active" gap dielectric therebetween is indicated by one X in FIG. 1.

The preferred method of this invention includes building in a first phase a test capacitor like the capacitor of FIG. 1 by using the above prior art curtain coating process except omitting the coplanar electrodes 17a and 17b of this invention or by omitting at least the electrode 17b that has essentially no capacitance with an adjacent co-overlapping electrode (e.g. 16) because electrodes 16 and 17b are both connected to the same terminal 24. This expendable test capacitor has a capacitance that is attributable entirely to the overlapping relationship between electrodes 15 and 16. This capacitance value is measured. The amount by which this measured value falls short of the desired capacitance is then determined.

In a second phase of the preferred method of this invention a determination is made of a geometry of the coplanar electrodes 17a and 17b which electrodes if added would make up the short-fall capacitance. In this example, the capacitance attributable to the overlapping of coplanar electrode 17a with electrode 16 is readily calculated by the standard plate capacitor formula.

However, the small fringing-edge or gap capacitance $C_F$ between the coplanar pair of electrodes 17a and 17b is not so predictable. This planar-electrodes-gap, $C_F$, capacitance may be varied by changing the gap between the coplanar electrodes and the width (front to back as shown) at the gap of the coplanar electrodes 17a and 17b, but among other factors also depends upon how many such coplanar pairs are employed.

Empirical determination of the relationship between the geometry of n pairs of coplanar electrodes may best be made, prior to carrying out the method of this invention, by making a series of experimental capacitors having no main overlapping electrodes but with one, two, three etc. pairs of coplanar electrodes, respectively. Additional experimental capacitors would contain coplanar electrode pairs. By such empirical means it is possible knowing the dielectric constant of the ceramic and the dimensions of the electrodes, to accurately predict the amount of capacitance attributable to coplanar electrode pairs to be added in the third phase of the method of this invention.

Several groups of such experimental capacitors have been made in which the width of the buried coplanar electrodes (from front to back as shown in the Figures) is 83 mils (2.1 mm) and the dielectric constant of the ceramic body is K=60. Parameters varied from group to group are the coplanar electrodes gap span dimension G (left to right as shown in the Figures), the spacing between adjacent pairs of coplanar electrodes t, and the number N of the coplanar-electrode pairs. Only coplanar pairs of electrodes are buried in these experimental capacitor bodies. The measured values of total capacitance of each experimental capacitor is shown in the Table below.

TABLE

| Ex. # | gap G (mils) | ceramic layers thickness t (mils) | no. pairs electrodes N | capacitance $C_T$ ($10^{-9}$ farads) |
|---|---|---|---|---|
| | 10 | 0.7 | 5 | 1.6 |
| | 10 | 0.7 | 10 | 1.88 |
| | 10 | 0.7 | 20 | 2.6 |
| | 20 | 0.7 | 5 | 1.2 |
| | 20 | 0.7 | 10 | 1.34 |
| | 20 | 0.7 | 20 | 1.67 |
| | 40 | 0.7 | 5 | 0.84 |
| | 40 | 0.7 | 10 | 0.93 |
| | 40 | 0.7 | 20 | 1.03 |
| | 10 | 1.4 | 5 | 1.84 |
| | 10 | 1.4 | 10 | 2.42 |
| | 10 | 1.4 | 20 | 3.34 |
| | 20 | 1.4 | 5 | 1.45 |
| | 20 | 1.4 | 10 | 1.62 |
| | 20 | 1.4 | 20 | 2.04 |
| | 40 | 1.4 | 5 | 0.91 |
| | 40 | 1.4 | 10 | 1.03 |
| | 40 | 1.4 | 20 | 1.18 |

In the embodiment illustrated in FIGS. 1, 2 and 3, the overlap and therefore the capacitance between electrodes 17a and 16 is typically subject to variation in registrations amounting to from around 2% for large overlapping areas (e.g. 10 mm²) to 20% for small areas (e.g. 3 mm²). Thus it is preferred to include the electrode 17a in the test capacitor during the first phase, and to add in phase two (at mass production) the electrode 17b, using one screen that produces the electrode pattern 17 which includes 17a and a slightly enlarged 17b together, whereby the dimensions of the gap are fixed from capacitor to capacitor in phase two manufacturing. The added capacitance attributable to the coplanar-electrodes-gap capacitance is not subject to variation from capacitor to capacitor due to variations in screen registration.

Note also that the addition of the coplanar electrodes 17a and 17b have eliminated the capacitance between the termination 22 and the top (left) end of the electrode 16 so that the total capacitance is no longer a function of the geometry of the termination. Another pair of spaced apart coplanar electrodes (not shown) may be added under the first main electrode 15 to similarly eliminate variations in the stray capacitance between the main electrode 15 and termination 24.

A major advantage of the method of this invention is that the mask in the electroding screen determines the gap dimension between coplanar electrodes 17a and 17b whereas the control of the overlap area between adjacent parallel electrodes (e.g. 17a and 16) depends upon the registration accuracy achieved between them.

The capacitor 26 of FIG. 4 has four main mutually overlapping electrodes 28, 30, 32 and 34 and two pairs of coplanar electrodes 36a/36b and 38a/38b. In a preferred method for making capacitor 26, at phase two the test capacitor having only the four electrodes 28, 30, 32 and 34, it is supposed to have had a test capacitance requiring addition of more than one pair of coplanar electrodes to reach the desired total capacitance. Note also that the gap between the coplanar electrodes is shifted to the right so that there is no overlap between electrodes 36b and 34 and there is a minimum of stray capacitance therebetween.

This stray capacitance between a main and a coplanar electrode in the capacitor of FIG. 4 may alternatively be held to a low value by substituting for the electrode pairs 36a/36b the pair 40a/40b shown in FIG. 5 or the pair 42a/42b shown in FIG. 6. A possible advantage of the electrode pair 42a/42b is that the length of gap between 42a and 42b may be made longer than the width of the capacitor body, potentially reducing or eliminating the need for more coplanar electrodes for reaching the desired capacitance value.

Referring to the capacitor 46 in FIG. 7, the corresponding test capacitor (not shown) made in phase one of the method has a floating electrode 48 and two pairs of coplanar oppositely terminated electrodes 50a/50b and 52a/52b. The addition of the coplanar capacitance-adjusting pair of electrodes 54a/54b at stage two of the method is to bring the capacitance of manufactured product up to the desired value. The series configuration of the main electrodes 50a/50b, 48 and 52a/52b is especially attractive for use in this invention. The capacitance adjusting electrodes 54a/54b in this construction are not needed for eliminating the terminations-to-main-overlapping-electrodes stray capacitance which are inherently absent in the test capacitor structure. Furthermore pairs of coplanar electrodes (e.g. 54a/54b) that are added in plane 41 will have no overlapping relationship with adjacent main electrodes (e.g. 50a/50b) in the adjacent plane 43 provided the gaps of each are approximately co-registered as shown in FIG. 7. These factors simplify the determination of coplanar electrodes parameters, that when added to the main electrodes will accurately bring the total capacitance close to the target value.

The capacitor 58 of FIG. 8 illustrates the use of a series of capacitance-adjusting coplanar electrode pairs 60a/60b, 62a/62b, 64a/64b and 66a/66b having increasingly wider gaps with corresponding increasingly smaller gap capacitances. The method may include repeating phases one and two and thus building and testing a second test capacitor. The second test capacitor may include one or more capacitance-adjusting coplanar electrode pairs (e.g. 60a/60b and 62a/62b). The capacitance measurement of the second test capacitor will indicate what additional electrode pairs will be needed in the stacks to be manufactured in what then becomes phase two of this method.

The capacitance adjusting feature in the method of this invention has been shown to be applicable to capacitors of the interdigitated-electrodes type (e.g. FIG. 4) having main overlapping electrodes (28, 30, 32 and 34) that provide most of the capacitance, and has been shown to be applicable to capacitors of the series type (e.g. FIG. 7) having main overlapping electrodes (50a, 50b, 48, 52a and 52b) that provide most of the capacitance. Thus in this method the test capacitor is made by assembling a stack of green ceramic layers each of which has a pattern of electroding ink. Each of a first group of electroding ink patches (e.g. 30 and 34 in FIG. 4, or 50a and 52a in FIG. 7) extend to a left side (as shown) of the stack (26 or 46). Each of a second group of patches (28 and 32 in FIG. 4 and 50b and 52b in FIG. 7) of the electroding ink patterns extend to a second side of the stack. That second group of patches (32 and 28) in FIG. 4 is in overlapping relationship with the first group of patches (30 and 34). That second group of patches 50b and 52b in FIG. 7 have overlapping relationship with the floating electrode patch 48 that in turn has an overlapping relationship with the first group of patches 50a and 52a. It is those overlapping electrodes that provide the base or main capacitance to which one or more coplanar pairs of capacitance-adjusting electrodes are added.

I claim:
1. A two-phase method for manufacturing multilayer ceramic capacitors comprising
   (a) making a test capacitor by assembling a stack of green ceramic layers, each of which have a pattern of electroding ink on a top face thereof, each of a first group of patches of said electroding ink patterns extending to a first side of said stack, each of a second group or patches of said electroding ink patterns extending to a second side of said stack and being disposed in overlapping relationship with at least one of said first group or at least one of another group of said patches also having an overlapping relationship with one of said first group; sintering said stack to densify and mature said ceramic, and measuring the capacitance between said first group and said second group of sintered patches; and
   (b) manufacturing a plurality of capacitors made by essentially the same steps by which said test capacitor was made except adding to said stack at least another green ceramic layer having an electroding ink pattern on a top face thereof, said another pattern composed of two spaced-apart coplanar patches of electroding ink, one of said coplanar patches extending to said first stack side and the other of said coplanar patches extending to said second stack side, and forming an electrodes-contacting termination at each of said first and second sides of said sintered stack to contact all of said electrodes extending respectively to said first and second sides so that the total capacitance between said terminations is greater than that of said test capacitor and is near a predetermined target capacitance value.
2. A multilayer ceramic capacitor comprising:
   (a) a ceramic body having a top face and at least two spaced-apart side faces;
   (b) a plurality of mutually parallel spaced-apart film electrodes buried in said ceramic body, each of a first group of said electrodes extending to one of said two side faces and being disposed in overlapping capacitive relationship with at least one other of said electrodes, each of a second group of said electrodes extending to the other side face of said body and being disposed in overlapping capacitive relationship with at least one of said first group electrodes or at least one of another group of said electrodes that also has an overlapping relationship with at least one of said first group electrodes;
   (c) at least one pair of spaced-apart coplanar film electrodes buried in said body, one and the other of said pair of coplanar electrodes extending respectively to said one and the other side faces; and

(d) two conductive terminations bonded respectively to said one and the other of said side faces to contact all of said extending electrodes at said respective faces.

3. In a multilayer ceramic capacitor of the kind having a ceramic body, two conductive terminations bonded to two spaced-apart side faces of said body respectively, and a system of mutually parallel spaced-apart film electrodes buried in said body and connected between said terminations, said buried electrodes having a mutually overlapping capacitive relationship to which the measurable capacitance of said capacitor is predominantly attributable, wherein the improvement comprises at least one pair of coplanar film electrodes disposed in said body essentially parallel with and spaced from said system of buried electrodes, one and the other of said coplanar electrodes extending respectively to said one and another body side faces to contact all of said respective terminations at said one and another body side faces.

* * * * *